Patented Nov. 7, 1922.

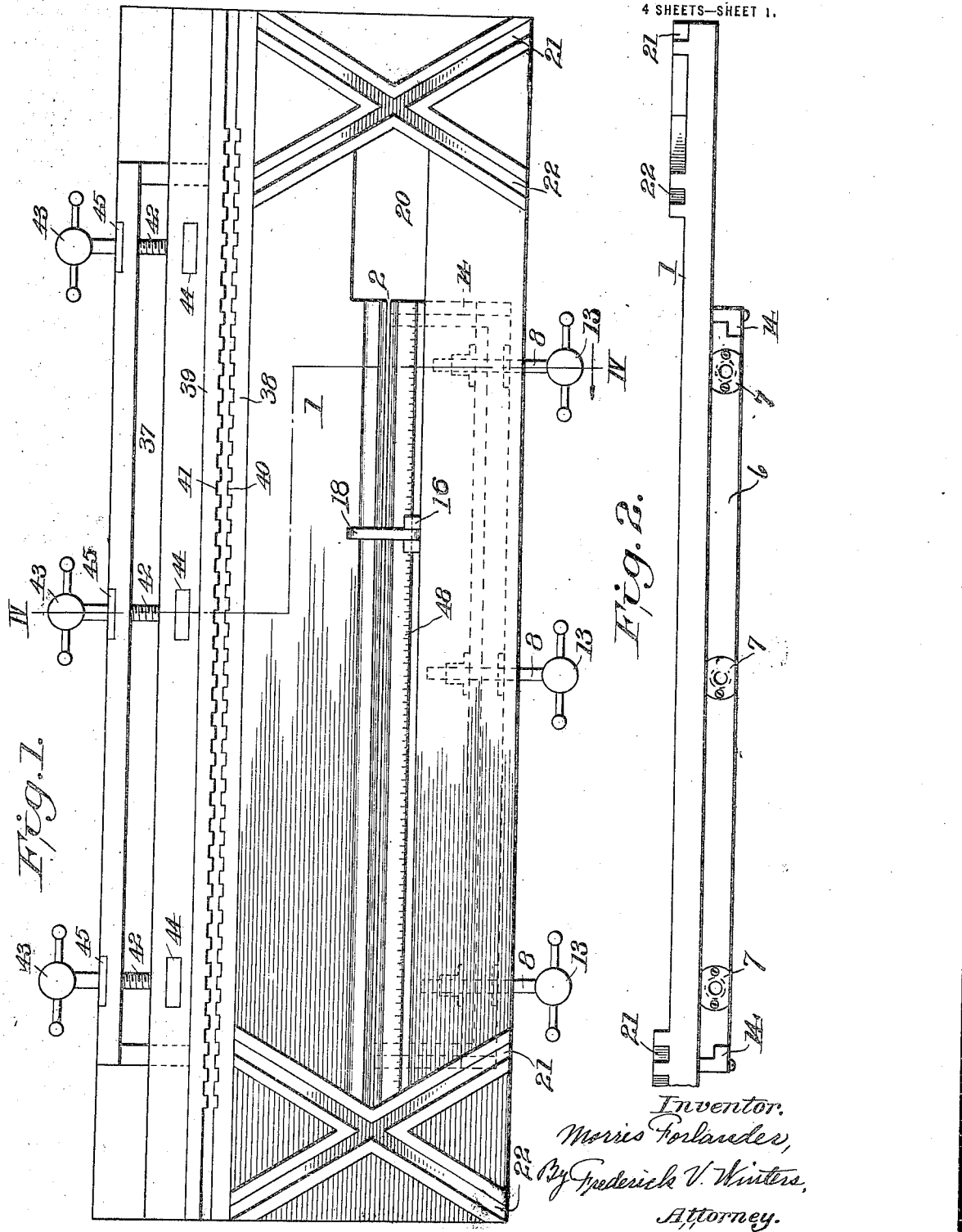

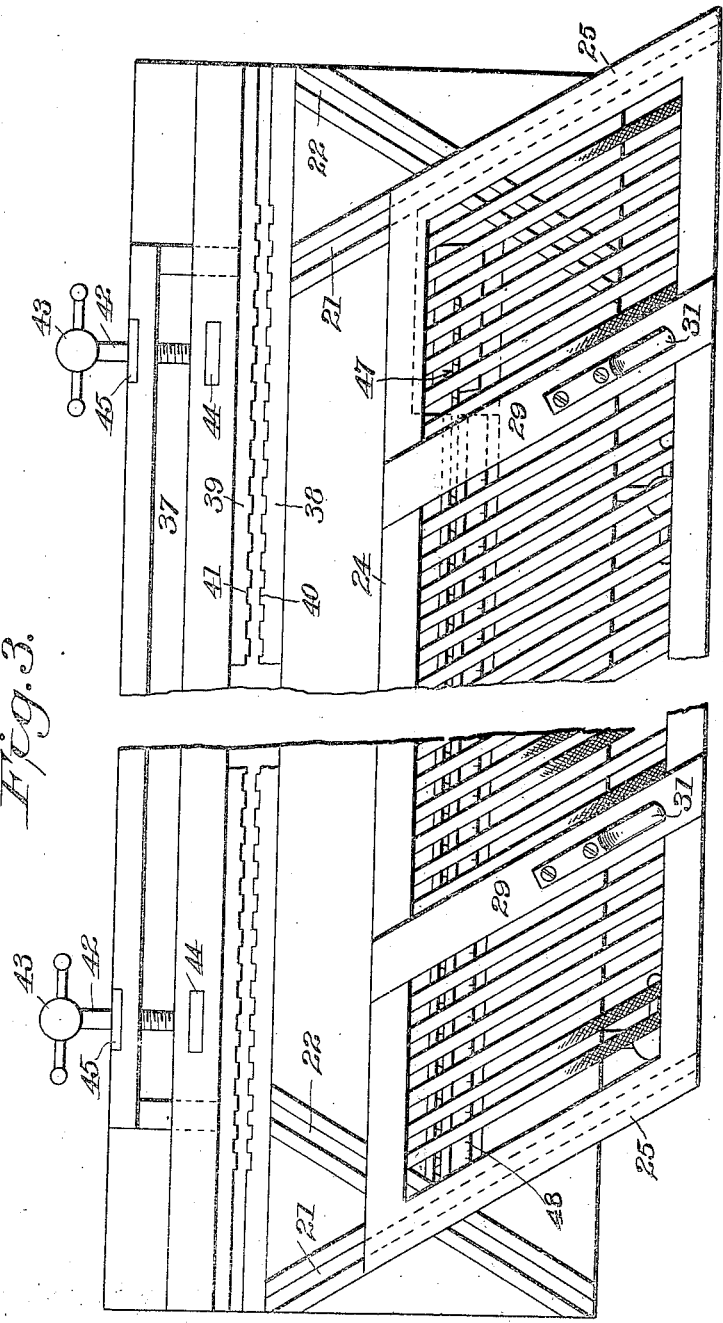

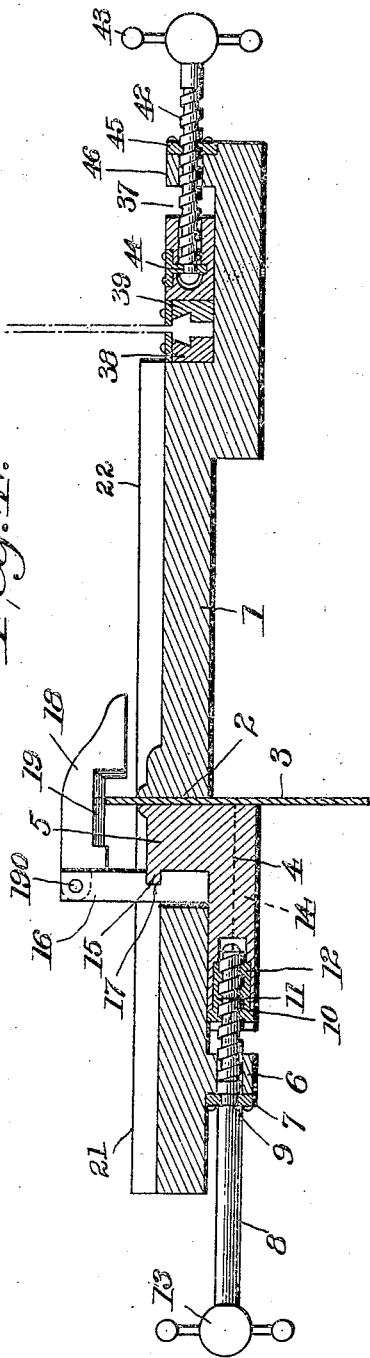
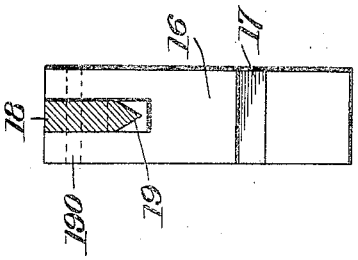
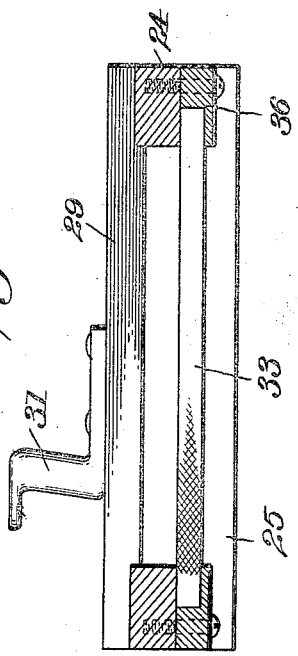

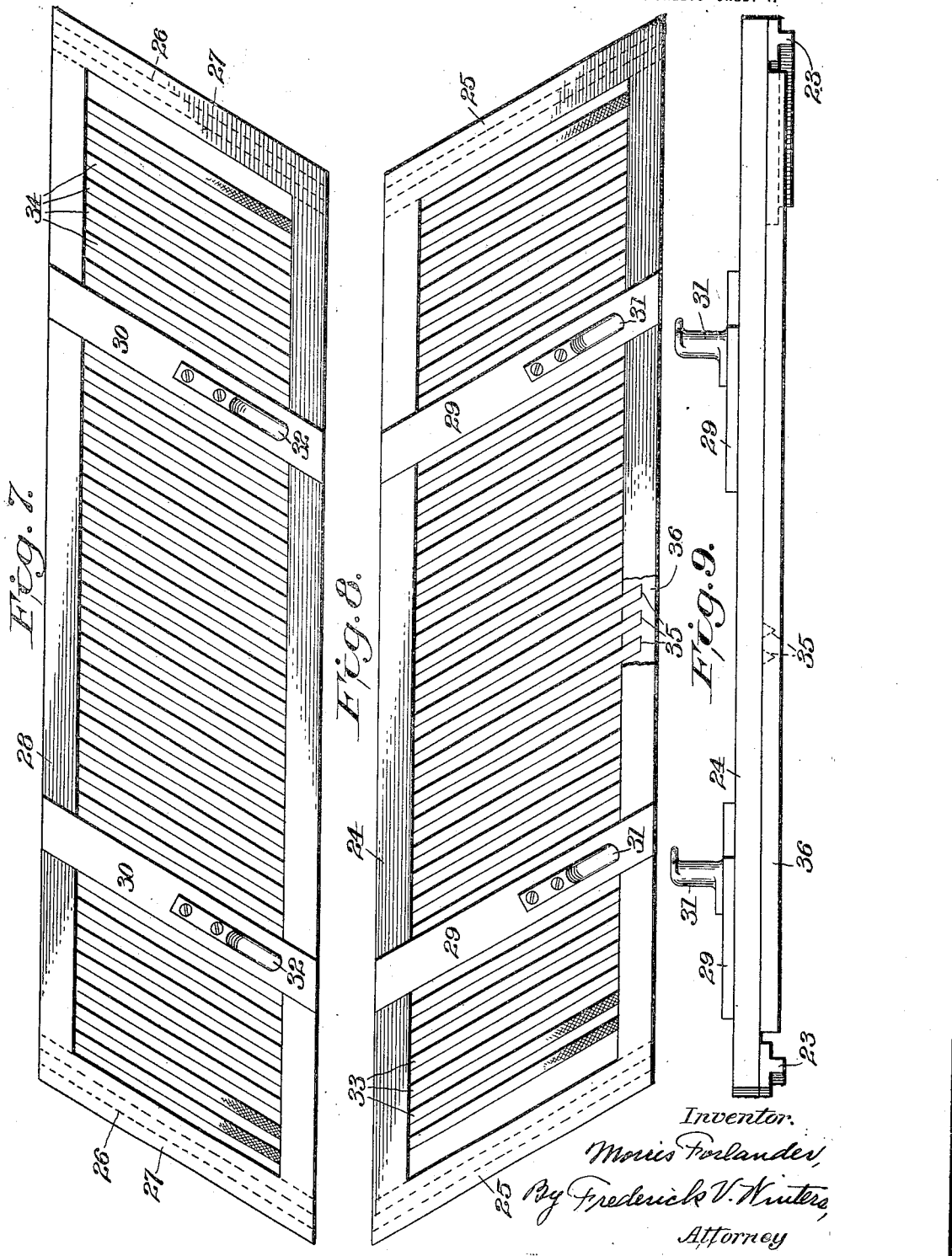

1,434,654

UNITED STATES PATENT OFFICE.

MORRIS FORLANDER, OF NEW YORK, N. Y.

SAW-FILING MACHINE.

Application filed May 14, 1921. Serial No. 469,459.

*To all whom it may concern:*

Be it known that I, MORRIS FORLANDER, a citizen of Russia, residing at New York, in the county and State of New York, have invented certain new and useful Improvements in Saw-Filing Machines, of which the following is a full, clear, and exact specification.

This invention relates to means for sharpening saws and has for its object to provide a machine which will do this work rapidly and efficiently.

Another object is to provide improved means for gaging the position of a saw to be filed so as to insure the teeth being made uniform and exactly alike. A further object is to provide improved and simplified means for guiding interchangeable reciprocating file frames whereby first one side and then the other side of every tooth of a saw may be filed by the successive use of said frames on the respective guides. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:

Figure 1 is a plan view of the table which holds a saw and on which the file frames are guided during the filing operation.

Figure 2 is a front elevation or edge view of said table with the clamping screws omitted.

Figure 3 is a plan view of the table showing one of the file frames in position for simultaneously filing one side of each tooth of a saw.

Figure 4 is a cross section of the table taken on the line IV—IV of Figure 1 and drawn to a larger scale.

Figure 5 is a cross section of one of the file frames.

Figure 6 is a detailed view of the gage.

Figures 7 and 8 are plan views respectively of the two file frames which are interchangeably used on the table, and Figure 9 is an edge view of the file frame shown in Figure 8.

The table 1 has a slot 2 extending longitudinally therethrough to receive a saw 3, as best shown in Figure 4. The saw may be clamped in said slot by a movable member 4 mounted to slide below one edge portion of the table and having an upwardly extending portion 5 arranged in the slot 2. A depending rib 6 on the table has plates 7 secured thereto, in which plates clamping screws 8 are swiveled at 9, Fig. 4. Said screws 8 have their inner threaded end portions 10 engaged between supplemental threaded strips 11 and 12 suitably fixed in the adjacent edge portion of the clamping member 4, so that said clamping member may be moved to clamp or release the saw by rotating the handles 13 of said screws 8. The clamping members 4 are supported and guided on angle strips 14, best shown in Fig. 2.

The upwardly extending portion 5 of the clamping member 4 has a horizontally extending ledge 15 on which a gage block 16 is adapted to slide, said block having a groove 17 fitting said ledge. The block 16 is arranged in the slot 2 of the table at the other side of the upwardly projecting portion 5 of the clamping member 4 from the saw 3, and is supported in vertical position by resting upon said clamping member, see Figure 4. To the upper end of said block 16 a gage member 18 is hinged at 190 to swing upwardly from its normal horizontal position shown in Figure 4. The under edge of the gage member 18 is beveled or V-shaped at 19 to fit between adjacent teeth of a saw. To properly position a saw with all of its teeth projecting the same distance above the table preparatory to sharpening said teeth, the gage block 16 may be moved along the ledge 15 for testing various points along the entire length of the saw. For instance, when the saw is inserted in the slot 2, the gage block may be placed near one end of said slot and the hinged member 18 dropped to horizontal position with its beveled edge 19 fitting between adjacent teeth at that end of the saw, whereupon the clamping screw 8 at that end of the table may be turned to clamp that part of the saw. After swinging the gage member 18 upwardly so as to disengage its beveled lower edge from the teeth of the saw, the gage block may be moved along the ledge 15 for similarly gaging the middle portion and the other end of the saw, whereupon the other clamping screws 8 may be rotated for clamping said portions of the saw. When the saw has been properly positioned or gaged throughout its length the gage block 16 may be removed from engagement with the ledge 15 by sliding the former beyond the upwardly extending portion 5 of the clamping member 4 into the enlarged end portion 20 of the slot 2 shown in Figure 1.

On top of the table, near opposite ends thereof, oblique guide slots 21 and 22 are formed so as to cross one another at points in line with the portion of the slot 2 in which the saw 3 is clamped. As best shown in Figure 1, said guide grooves form an X at each end of the table 1. The guide grooves 21 at opposite ends of the table are adapted to receive correspondingly oblique guide flanges 23 depending from a file-carrying frame 24 which is made in the form of a parallelogram having its end members 25 preferably carrying the guide flanges 23 and extending along correspondingly oblique lines. The guide grooves 22 at opposite ends of the table are adapted to similarly receive depending guide flanges 26 on the oblique ends 27 of another file carrying frame 28, it being noted that said oblique ends 27 extend in the opposite direction from the oblique ends 25 of the file frame 24.

Each of said frames 24 and 28 is provided with braces 29 and 30, respectively, preferably arranged obliquely to correspond with the ends of their frames and on said braces handles 31 and 32 are mounted for reciprocating the respective frames in their guide grooves on the table. Each of the frames 24 and 28 carries a plurality of obliquely arranged parallel files 33 and 34, respectively, said files being positioned in V-shaped notches 35 in strips 36 suitably fastened to the under surfaces of said frames, as best shown in Figs. 5, 8 and 9, two of said notches being shown in dotted lines in the latter figure. The strips 36 may be detachably fastened to the file frames in any suitable manner to provide for changing the files when necessary or desirable.

When a saw has been adjusted on the table 1, as hereinbefore explained, the file frames 24 and 28 are successively placed on the table and reciprocated the required number of times (usually two or three reciprocations are sufficient) to sharpen the opposite sides of the saw teeth. It will be understood that said file frames are used one at a time, one being removed from the table while the other is in use.

The table 1 may have a channel 37 formed longitudinally in its upper surface near its rear edge, as shown in Figures 1, 3 and 4. In said channel there are arranged fixed and movable saw setting jaws 38 and 39, respectively, said jaws having oppositely notched edges 40 and 41 for bending alternate saw teeth in opposite directions, as will be readily understood, when the movable jaw 39 is forced toward the fixed jaw 38. Said movable jaw 38 may be actuated by screws 42 having operating handles 43. The inner ends of said screws 42 have suitable swiveled connections with the movable jaw 39, as at 44 in Fig. 4, while the threaded shanks of said screws engage corresponding internal threads 45 in the outer side portion 46 of the channel 37. A saw setting device is thus mounted on the same table with the saw sharpening appliance, which is of great convenience to carpenters and others who have occasion to rehabilitate worn saws.

In Figure 3 a saw 47 is shown clamped in the slot 2 of the table in position for sharpening. In Figures 1 and 3 a scale 48 is shown on the upwardly extending portion 5 of the clamping member 4 to enable the user to clamp the saw at the precise point required for bringing the teeth into position for engagement by the files when the frames carrying the latter are placed in their guide grooves on the table.

I claim:

1. In a saw-sharpening machine, the combination with a table having means for securing a saw to be sharpened thereto, of saw-sharpening means, guiding means on said table to be engaged by said sharpening means when sharpening the saw teeth on one side, and other guiding means on the table to be engaged by the sharpening means when sharpening the saw teeth on the other side.

2. In a saw-sharpening machine, the combination with a table, of means for securing a saw to be sharpened thereto, saw-sharpening means, parallel oblique guides at opposite ends of the table to be engaged by said saw-sharpening means when sharpening the saw teeth on one side, and other parallel oblique guides on the ends of the table extending at a different angle from the first guides to be engaged by the saw-sharpening means when sharpening the saw teeth on the other side.

3. In a saw-sharpening machine, the combination with a table, of means for securing a saw to be sharpened thereto, saw-sharpening means, parallel oblique guides at opposite ends of the table to be engaged by the saw-sharpening means when sharpening the saw teeth on one side, and other oblique guides on the ends of the table crossing the first mentioned guides and adapted to be engaged by the saw-sharpening means when sharpening the saw teeth on the other side.

4. In a saw-sharpening machine, the combination with a table, of means for securing a saw to be sharpened thereto, saw-sharpening means, parallel oblique guides at opposite ends of the table to be engaged by the saw-sharpening means when sharpening the saw teeth on one side, and other parallel oblique guides on the ends of the table crossing the first mentioned guides at points in line with the saw-securing means and adapted to be engaged by the saw-sharpening means when sharpening the saw teeth on the other side.

5. In a saw sharpening machine, the combination with a table having a slot therein, of a movable clamping member arranged below the table and having an upwardly extending portion arranged in said slot, means for adjusting said clamping member in the slot for clamping a saw therein, and sharpening means movable on the table to operate upon the teeth of the saw.

6. In a saw sharpening machine, the combination with a table having a slot therein, of a clamping member, means for adjusting said member to clamp a saw in said slot, a saw gage mounted to slide along said clamping member in said slot for properly positioning the saw throughout its length, and saw sharpening means movable on the table for operating upon the teeth of the saw.

7. In a saw sharpening machine, the combination with a table having a slot therein, of a clamping member having a longitudinal ledge, means for adjusting said member to clamp a saw in said slot, a saw gage mounted to slide in said slot along said ledge on the clamping member for properly positioning a saw throughout its length, and saw sharpening means movable on the table for operating upon the teeth of the saw.

8. In a saw sharpening machine, the combination with a table having a slot therein, of a clamping member arranged below the table and having a portion extending upwardly into said slot, means for adjusting said member for clamping a saw in the slot, a ledge extending along the free edge of said upwardly extending portion of the clamping member, a saw gage movable on the clamping member and having a groove engaging said ledge, said gage extending through the slot and having a hinged arm to engage the teeth of the saw, said slot in the table being enlarged at one end to permit the removal of said gage, and saw sharpening means movable on the table to operate upon the teeth of the saw.

9. In a saw sharpening machine, the combination with a table having a slot therein, of a clamping member arranged below the table and having a portion extending upwardly into said slot, means for adjusting said member for clamping a saw in the slot, a ledge extending along the free edge of said upwardly extending portion of the clamping member, a saw gage movable on the clamping member and having a groove engaging said ledge, said gage extending through the slot and having a hinged arm provided with a V-shaped lower edge to fit between adjacent teeth of the saw, said slot in the table being enlarged at one end to permit the removal of said gage and saw sharpening means movable on the table to operate upon the teeth of the saw.

In testimony whereof I have signed my name to this specification.

MORRIS FORLANDER.